US012511168B2

(12) United States Patent
Shikaloff et al.

(10) Patent No.: US 12,511,168 B2
(45) Date of Patent: Dec. 30, 2025

(54) SYSTEM AND METHOD FOR ASSIGNING RESOURCES TO NETWORKS

(71) Applicant: Microsoft Technology Licensing, LLC, Redmond, WA (US)

(72) Inventors: Nina Shikaloff, San Rafael, CA (US); Ritu Lakhotia, Bengaluru (IN); Loren Erik Anderson, Seattle, WA (US); Florine Segers, San Francisco, CA (US); V. S. Srujana Oruganti, Bengaluru (IN); Abhishek Kalai Raghavendra, Bangalore (IN); Dinesh Badagayedapadavu Srinivas, Bengaluru (IN); Madhura Bhat Hathoklu, Bengaluru (IN); Apurva Bharatkumar Shah, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 18/571,615

(22) PCT Filed: Jun. 1, 2022

(86) PCT No.: PCT/US2022/031678
§ 371 (c)(1),
(2) Date: Dec. 18, 2023

(87) PCT Pub. No.: WO2022/271421
PCT Pub. Date: Dec. 29, 2022

(65) Prior Publication Data
US 2024/0281296 A1 Aug. 22, 2024

(30) Foreign Application Priority Data
Jun. 25, 2021 (IN) .............................. 202141028552

(51) Int. Cl.
G06Q 10/06 (2023.01)
G06F 3/0484 (2022.01)
(Continued)

(52) U.S. Cl.
CPC .......... *G06F 9/505* (2013.01); *G06Q 10/0631* (2013.01)

(58) Field of Classification Search
CPC ........ G06F 9/505; G06F 9/50; G06Q 10/0631
See application file for complete search history.

(56) References Cited

U.S. PATENT DOCUMENTS

| 7,987,110 | B2 * | 7/2011 | Cases | G06Q 50/01 |
| | | | | 705/319 |
| 8,433,790 | B2 * | 4/2013 | Polley | H04L 41/12 |
| | | | | 709/224 |

(Continued)

FOREIGN PATENT DOCUMENTS

KR 20180019832 A 2/2018

OTHER PUBLICATIONS

"A 10-Step Tool for a Safe and Healthy Return to Work in Times of COVID-19", accessed on link https://www.ilo.org/sites/default/files/wcmsp5/groups/public/@americas/@ro-lima/@sro-port_of_spain/documents/publication/wcms_745881.pdf, May 26, 2020, 14 pages.

(Continued)

Primary Examiner — Umar Cheema
Assistant Examiner — Golam Mahmud

(57) ABSTRACT

Computer systems and computer-implemented methods are configured to assign limited resources such as cloud or other computing resources to objects such as networks of computers having demands for the resources. Efficiencies are optimized by assigning the objects based upon an intra-network score and an inter-network score, both of which may include an associated network density and/or an asso- (Continued)

ciated metric, and may be based on information received from electronic records. The metric may be a parameter relating to a factor or other characteristic that is desired to be optimized by the assignments. For example, the metric may be related to costs of communications between the computers of a network.

18 Claims, 5 Drawing Sheets

(51) Int. Cl.
*G06F 9/50* (2006.01)
*G06Q 10/04* (2023.01)
*G06Q 10/0631* (2023.01)
*G06Q 10/10* (2023.01)

(56) References Cited

U.S. PATENT DOCUMENTS

| | | | | |
|---|---|---|---|---|
| 9,455,870 | B1* | 9/2016 | Kabbani | H04L 41/12 |
| 10,320,701 | B1* | 6/2019 | Abramson | G06F 16/285 |
| 2009/0030927 | A1 | 1/2009 | Cases | |
| 2009/0034432 | A1* | 2/2009 | Bonta | H04W 74/02 |
| | | | | 370/255 |
| 2016/0188355 | A1* | 6/2016 | Cao | G06F 9/50 |
| | | | | 718/1 |
| 2016/0300160 | A1 | 10/2016 | Klein et al. | |
| 2018/0232680 | A1* | 8/2018 | Hazime | G06Q 10/06393 |
| 2018/0285791 | A1 | 10/2018 | Ashikhmin | |
| 2020/0012981 | A1 | 1/2020 | Davison | |
| 2020/0242527 | A1* | 7/2020 | Das | G06Q 10/0639 |
| 2020/0322307 | A1 | 10/2020 | Zhang et al. | |
| 2020/0329005 | A1 | 10/2020 | Anerella et al. | |
| 2021/0050116 | A1 | 2/2021 | Sabeti et al. | |
| 2021/0294667 | A1* | 9/2021 | Chaganti | G06F 9/5083 |

OTHER PUBLICATIONS

"COVID-19 Back-to-Work Checklist", accessed on link https://www.shrm.org/resourcesandtools/tools-and-samples/hr-forms/pages/covid-19-back-to-work-checklist.aspx, retrieved on Jun. 1, 2021, Published on Feb. 11, 2021, 6 pages.

"Returning to the Workplace after COVID-19: What Boards should be Thinking About", accessed on link https://web.archive.org/web/20210114110056/https:/www.pwc.com/us/en/services/governance-insights-center/library/covid-19-returning-workplace-boards.html, retrieved on Jun. 1, 2021, 7 pages.

Butler, et al., "Personal Productivity and Well-Being", arXiv:2103.02524, Mar. 3, 2021, 20 pages.

Cheng, et al., "Back to Business and (Re)Employing Workers? Labor Market Activity during State Covid-19 Reopenings", In Working Paper 27419 of National Bureau of Economic Research, Jun. 25, 2020, 59 pages.

Coleman, et al., "10 Considerations for Transitioning Back to Work in a Post-COVID-19 World", accessed on link https://www.gensler.com/blog/10-considerations-for-transitioning-back-to-work-in-a-post, Apr. 20, 2020, 7 pages.

International Search Report and Written Opinion received for PCT Application No. PCT/US2022/031678, Sep. 20, 2022, 16 pages.

Rosen, Amy., "Navigating Your Future Workplace Post COVID-19: A Roadmap", accessed on link https://www.workdesign.com/2020/05/navigating-your-future-workplace-post-covid-19-a-roadmap/, May 6, 2020, 10 pages.

Shaw, et al., "Opening the Workplace After COVID-19: What Lessons Can be Learned from Return-to-Work Research?", In Journal of Occupational Rehabilitation, vol. 30, Jun. 19, 2020, pp. 299-302.

* cited by examiner

| NETWORKS | 202A | 202B | 202C | 202D |
|---|---|---|---|---|
| 202A | 29 | 19 | 12 | 32 |
| 202B | 19 | 45 | 12 | 0 |
| 202C | 12 | 12 | 17 | 5 |
| 202D | 32 | 0 | 5 | 7 |

FIG. 4

SYSTEM AND METHOD FOR ASSIGNING RESOURCES TO NETWORKS

CROSS-REFERENCE TO RELATED APPLICATIONS

This application is the U.S. national phase of the International Patent Application PCT/US2022/031678, filed Jun. 1, 2022, which claims the benefit of Indian Patent Application number 202141028552, filed Jun. 25, 2021, the entire contents of all are incorporated herein by reference.

BACKGROUND

Computing resources are commonly shared among groups of computers. For example, networks of individual computers operated by different entities may access cloud computing resources provided by third parties. However, the capacity or total amount of computing resources available from such cloud computing service providers is limited, and it may not be possible to simultaneously provide those computing resources to all of the computer networks desiring to have access to the services. Under circumstances such as these it may be necessary or desirable to allocate or assign the limited computing resources to selected computer networks.

There remains a continuing need for systems and methods for assigning capacity-limited computing resources to networks of computers desiring access to the computing resources.

Systems and methods that optimize factors such the efficiencies of the computer networks assigned to the computing resources and efficiencies of the computing resources themselves would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of this disclosure, computer systems and computer-implemented methods are configured to assign limited resources such as cloud or other computing resources to objects such as networks of computers having demands for the resources. Efficiencies are optimized by assigning the objects based upon an intra-network score and an inter-network score, both of which may include an associated network density and/or an associated metric. The metric may be a parameter relating to a factor or other characteristic that is desired to be optimized by the assignments. For example, the metric may be related to an amount or quantity of an effectiveness or an efficiency of communications between the computers of a network and/or an effectiveness or an efficiency of communications between the networks. While communication amounts may signify a depth or quantity of efficiency, the network density determines a breadth of communications efficiency to enhance the value of the assignment recommendations.

BRIEF DESCRIPTION OF THE DRAWINGS

Non-limiting and non-exhaustive examples are described with reference to the following Figures.

FIG. 4 is a chart illustrating exemplary intra-network scores and collaboration scores, in accordance with aspects.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects disclosed herein may be practiced as methods, systems, or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
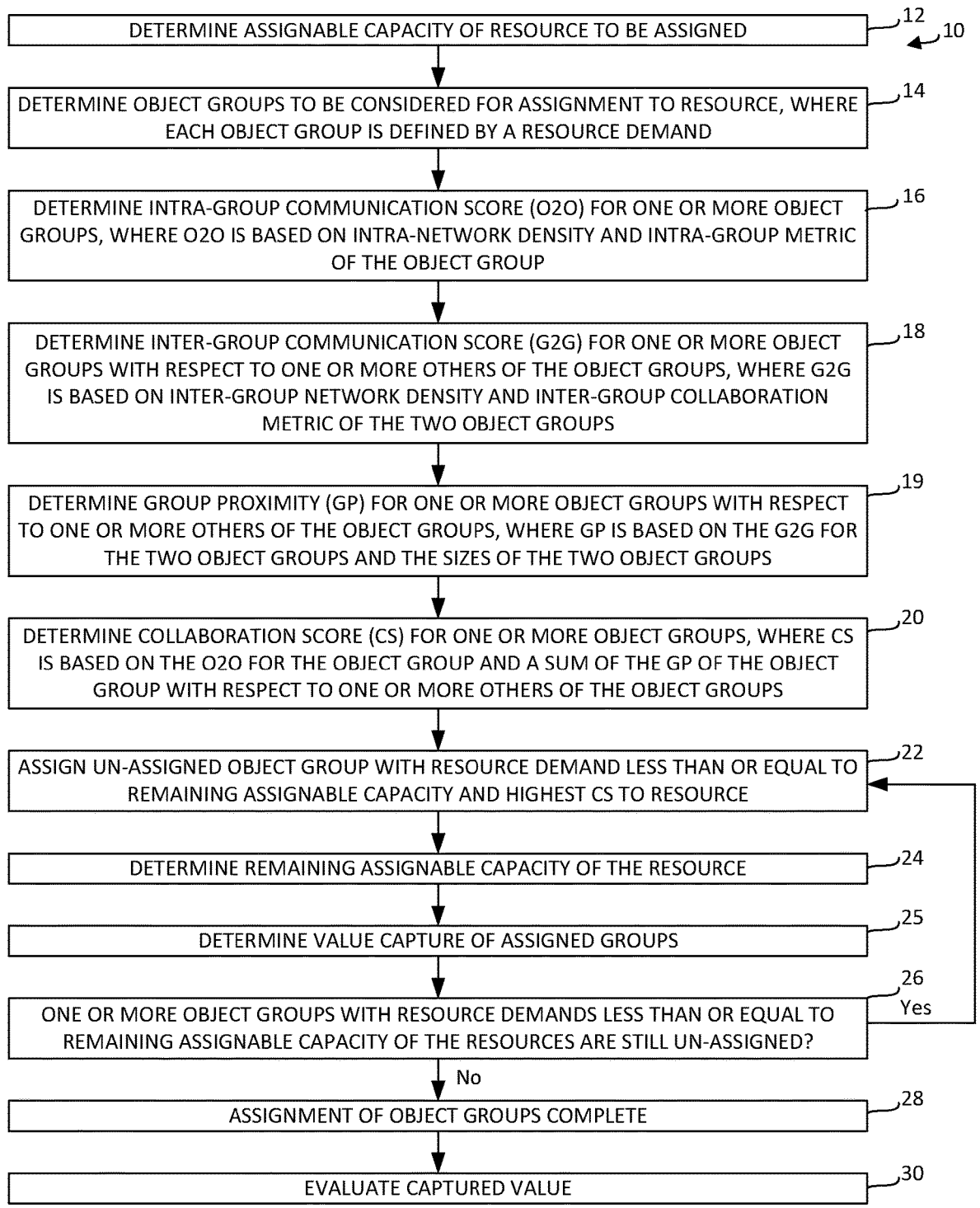
FIG. 1 is a diagrammatic illustration of a method for assigning resources, in accordance with aspects.
Figure 2:
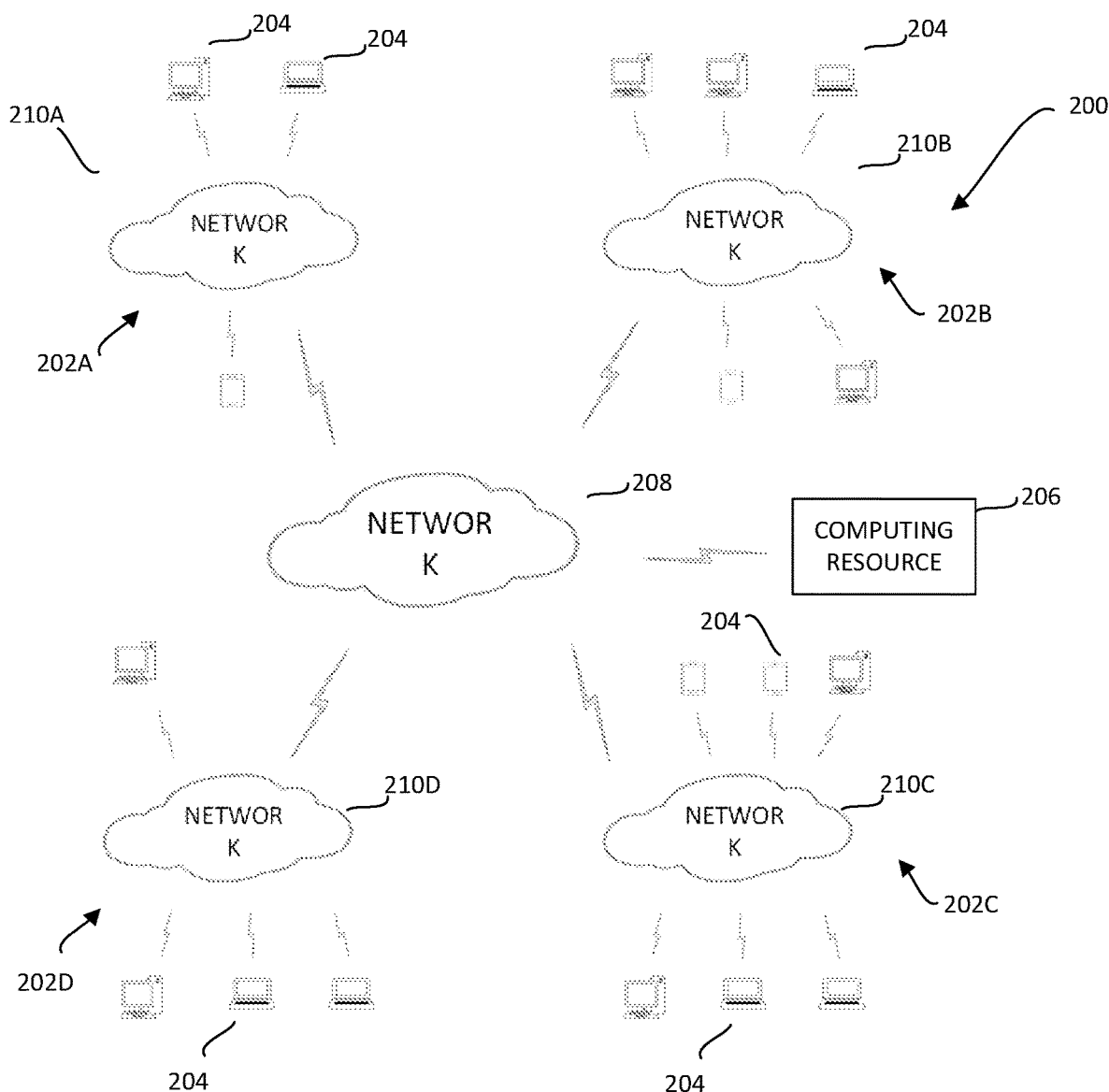
FIG. 2 is a diagrammatic illustration of networks of computers that can be assigned to a cloud computing resource, in accordance with aspects.
Figure 3:
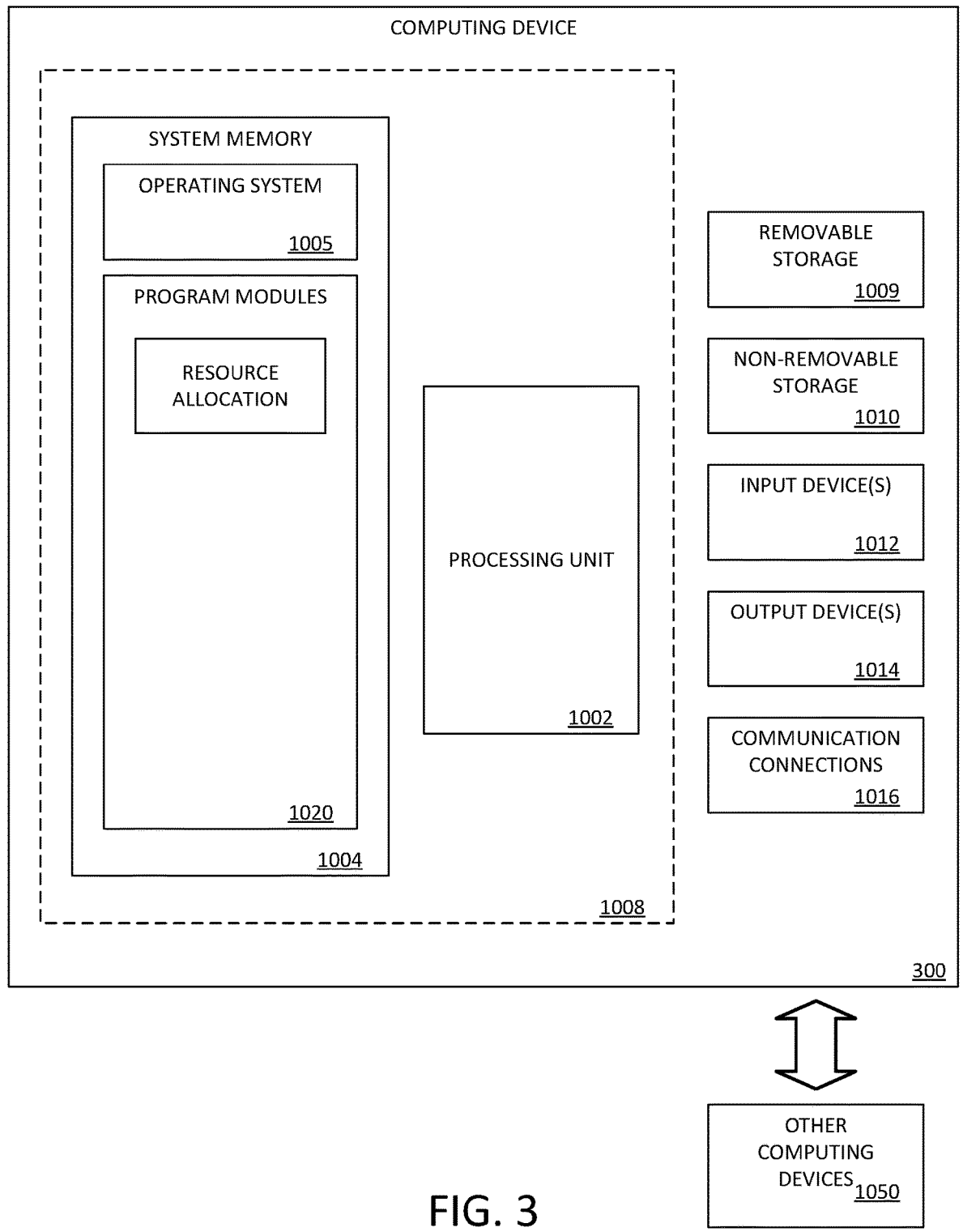
FIG. 3 is a diagrammatic illustration of a computing device that can be operated in accordance with the methods, in accordance with aspects.

FIG. 1 is a diagrammatic illustration of a method 10 for assigning groups of objects to a capacity-limited resource. FIG. 2 is a diagrammatic illustration of a computing network 200 including groups or networks 202A-202D of computers 204 coupled to a computing resource 206 by a network 208. FIG. 3 is a diagrammatic illustration of a computing device 300 in accordance with aspects. As described below, the computing device 300 may be operated in accordance with the method 10 to assign one or more of the networks 202A-202D to the computing resource 206 based on computing demands of the networks and an assignable computing capacity of the computing resource. In situations where the assignable computing capacity of the computing resource 206 is less than a sum of the computing demands of the networks 202A-202D that might be assigned to the computing resource, method 10 can determine which of the networks can be assigned to optimize certain factors, e.g., communication-related factors such as a cost or amount of data communications between the computers 204 of a given network and/or a cost or amount of data communications between the networks. As used herein, computing resource 206 may be a hardware or software resources that may be utilized by networks 202A-202D. In examples, processes or applications associated with a network, such as networks 202A-202D, may be more efficiently executed when sharing the computing resource 206. For example, if a computing resource 206 is server computer, hosting or executing the processes related by a network, such as network 202A, may lead to more efficient collaboration as the processes can communicate and share information using the server's internal memory, thereby reducing the need to utilize networks to share information across devices.

In the aspects shown in FIG. 2, computing network 200 includes four networks 202A-202D of computers 204 for purposes of example. Other aspects (not shown) include more or fewer networks such as 202A-202D. For purposes of providing an example, in the illustrated aspects network 202A includes three computers 204, network 202B includes five computers 204, network 202C includes six computers 204, and network 202D includes four computers 204. Other aspects (not shown) include networks such as 202A-202D having more or fewer computers 204. Computers 204 of networks 202A-202D may be electronic devices that communicate with one or more other computers of the associated network (e.g., intra-network communications), and/or that communicate with one or more computers of one or more of the other networks (e.g., inter-network communications). As shown diagrammatically in FIG. 2, for example, the computers 204 may include desktop computers or computer systems, laptop computers or computer systems, and/or mobile devices such as tablets and/or mobile phones. Other types of computers 204 may also be used. Further, while networks 202A-202D are described as being comprised of specific computing devices, networks 202A-202D could also be comprised of other components. For example, network 202A could comprise a set of interrelated processes, applications, or the like. As shown in FIG. 2, the computers 204 of networks 202A-202D are coupled for data (e.g., including voice) communications by network infrastructures 210A-210D, respectively. Each of the network infrastructures 210A-210D may include one or more conventional or otherwise known network components, such as for example local area networks (LAN), wide area networks (WAN), ethernet, and wired or wireless (e.g., WiFi) components (not separately shown). Such network components may include one or both of private or public (e.g., the internet) components. Alternatively, networks 202A-202D may be comprised of applications or processes that communicate with one another, share data or other resources, or are otherwise associated.

Computing resource 206 is shown diagrammatically in FIG. 2 for purposes of example, and may include one or more networked computers, servers, and/or systems of such computers or servers (not separately shown). The network 208 coupling the networks 202A-202D to the computing resources 206 may include one or more network components such as those described above in connection with networks 202A-202D. In aspects, for example, computing resource 206 may be a cloud computing resource coupled to the networks 202A-202D over a public network 208 such as the internet.

Each of the networks 202A-202D may access the computing resource 206 for the resources provided by the computing resource (e.g., via the computers 204 associated with the networks). For example, networks 202A-202D may access the computing resource 206 for computational resources (e.g., for solving mathematical problems or analyzing business-type data and providing solutions) and/or for receiving data such as that defining web pages or other desired information stored by the computing resource. The networks 202A-202D may be characterized or defined by demands, such as anticipated or specified (e.g., maximum or average) demands, that they may need and expect to be provided by or received from the computing resource 206. The specified demands of the networks 202A-202D may be based on factors such as, for example, the number of computers 204 in the associated network, the nature of the functions provided by the computers (e.g., if the computers are used for computationally intensive purposes vs. relatively simple computational purposes), or the amount (e.g., length of time during a day and/or what portion of the day) that the computers are operated.

Computing resource 206 may be characterized or defined by a capacity of the resources that it is capable of providing, e.g., in response to requests for access to the resources by the networks 202A-202D. The capacity of the computing resource 206 may be specified, for example, in terms of a maximum capacity (e.g., available storage, memory, CPU or GPU availability, etc.) that the computing resources 206 may provide (e.g., at any given instant of time, or during a predetermined period of time such as a period of one or more seconds or minutes) or other assignable capacity (e.g., an amount less than the maximum capacity to reduce a likelihood of a failure or malfunction of the computing resource). At some or all times, the assignable capacity of the computing resources 206 may be less than a sum of the demands for those resources by the networks 202A-202D. In such instances, it may not be possible for the computing resource 206 to provide requested resource demands to all of the networks 202A-202D.

As shown in FIG. 1, the method 10 to assign one or more of the networks 202A-202D to the computing resource 206 such that a sum of the resource demands of the assigned networks 202A-202D is less than or equal to the assignable capacity of the computing resource. In such aspects, one or more of the networks 202A-202D may not be assigned to the computing resource 206 to maintain the demand for resources from the computing resource at a level that is less than or equal to the assignable capacity. In particular, by method 10 the computing device 300 assigns the networks 202A-202D in a manner that optimizes or otherwise enhances factors defining desirable characteristics, such as communication-related or other operating characteristics, of the networks 202A-202D and/or 208 individually or in combination with others of the networks (e.g., intra-network communication characteristics and/or inter-network communication characteristics).

As shown in FIG. 1 at step 12, the method 10 determines an assignable capacity of the computing resource 206. The assignable capacity, which as noted above may be a capacity less than a maximum capacity, may be received from an information source defining specifications of the computing resource 206, or may be inputted by a user operating the computing device 300. In aspects, for example, the assignable capacity may be specified in terms of available memory, available processing cycles, available storage, CPU and/or GPU availability, available power, or the like.

At step 14 the computing device 300 determines the networks 202A-202D that are considered for assignment to the computing resource 206. The networks 202A-202D may be specified in terms of physical or logically coupled groups of computers 204. In aspects, for example, the networks 202A-202D may be the separate networks of different groups within an organization or other entity. For example, the networks 202A-202D may be the networks associated with the physically remote offices of an organization, and/or the networks of different groups within a given organization (e.g., accounting, product development and sales). Additionally or alternatively, the networks 202A-202D may be the networks of computers assigned to different groups of personnel working on different components of a product or service under development by the entity. In such examples, the networks 202A-202D may be determined based on received information defining the groups within the organization (e.g., based on the entity's organizational chart or structure). In other aspects a user may select or otherwise provide information defining the networks 202A-202D at step 14.

At step 16 a determination of an intra-network communication score (Intra-Network Score; also denoted as O2O or object-to-object score) is made for one or more of the networks 202A-202D (e.g., for each of the networks 202A-202D in aspects). The Intra-Network Score is based upon an intra-network density and an intra-network metric. In aspects, for example, the Intra-Network Score can be determined or computed using the Equation 1 below:

$$\text{Intra-Network Score} = \quad\quad\quad\quad\quad\quad\quad\quad\quad\quad\text{Eq. 1}$$
$$\text{intra-network density} * \text{intra-network metric}.$$

In aspects, the intra-network density is based upon the actual number of electronic connections between the computers 204 of the associated network 202A-202D and the potential number of electronic connections between the computers of the associated network. Alternatively, the intra-network density may represent an amount of communication that occurs between the members of the network. While specific examples are provided herein, one of skill in the art will appreciate that the intra-network density calculation can be based upon different factors related to the type of network and roles of the network's members. For example, a conventional organization network analysis approach may be used to determine the network densities. In aspects, for example, the intra-network density can be determined using the Equation 2 below:

$$\text{intra-network density} = \quad\quad\quad\quad\quad\quad\quad\quad\quad\quad\text{Eq. 2}$$
$$\text{actual connections between computers of the network}/$$
$$\text{potential connections between computers of the network}.$$

The number of actual connections between the computers 204 of a network 202A-202D may be determined, for example, by evaluating electronic records describing instances of communication sessions between the computers 204 of the network 202A-202D. Instances such as emails, text messages, phone calls, online meetings and/or other data communications between the computers 204 of the network 202A-202D can be used as an indication of an actual connection between the computers. In aspects, the determination of actual connections can be based on the number of such connections during a predetermined period of time, such as one or more hours or days. In these or other aspects, only one such instance of a connection between any two computers 204 of the network 202A-202D during the predetermined period of time may be used in connection with the determination of the number of actual connections (e.g., multiple separate or discrete emails between any two computers 204 during the predetermined period of time is counted as one actual connection for purposes of determining the intra-network density). As a non-limiting example, a daily-based determination of actual connections of the computers of network 202A may be three in the situation where, during a given twenty-four hour period, a first computer 204 of the network sent one email to each of a second computer and a third computer of the network, the third computer of the network sent five emails to a fourth computer of the network, and the fourth computer sent no emails to computers in the network.

The number of potential connections between the computers 204 of a network 202A-202D may be determined, for example, based on number of computers 204 in the associated network 202A-202D using the Equation 3 below, where n is the number of computers in the network:

$$\text{potential connections} = n^*(n-1)/2 \quad\quad\quad\quad\text{Eq. 3}$$

Other aspects of the method 10 may use other approaches for determining the intra-network densities of the networks 202A-202D

The intra-network metric is a metric defining a parameter relating to a factor or other characteristic that is desired to be optimized by the assignments provided by method 10. For example, the intra-network metric may be related to an amount or quantity of an effectiveness or an efficiency of communications between the computers 204 of the network 202A-202D. In aspects, for example, the intra-network metric may be determined based on an amount of data transmitted between the computers 204 of the network 202A-202D, or a cost of communications between the computers of the network. For example, the amount of data transmitted between the computers 204 of the network 202A-202D (e.g., during a predetermined time period which may or may not correspond to any time periods used in connection with the determination of the intra-group network density as described above) may be determined by records maintained in connection with the network infrastructures 210A-210D of the associated networks 202A-202D. Similarly, records of the costs of operating the network infrastructures 210A-210D may be accessed or otherwise used to determine the intra-network metric for the networks 202A-202D in connection with step 16.

At step 18 the computing device 300 computes or determines an inter-network communication score (Inter-Network Score; also denoted as a G2G or group-to-group score) for one or more of the networks 202A-202D (e.g., for each of the networks 202A-202D in aspects) with respect to one or more of the others of the networks 202A-202D (e.g., with respect to each of the other networks 202A-202D in aspects). For any two of the networks 202A-202D, the Inter-Network Score is based upon an inter-network density and an inter-network metric. In aspects, for example, the Inter-Network Score can be determined using the Equation 4 below:

$$\text{Inter-Network Score} = \quad\quad\quad\quad\quad\quad\quad\quad\quad\quad\text{Eq. 4}$$
$$\text{inter-network density} * \text{inter-network metric}.$$

In aspects, and similar to the intra-network density discussed above, the inter-network density for any two of the networks 202A-202D is based upon the actual number of electronic connections between the networks and the potential number electronic connections between the networks. In aspects, for example, the inter-network density can be determined using Equation 5 below:

$$\text{inter-network density} = \text{actual number of connections between the networks} / \text{potential connections between the networks.} \qquad \text{Eq. 5}$$

The number of actual and potential connections between any two of the networks 202A-202D (e.g., a first network and a second network) may be based on the number of computers 204 in each of the two networks. Conventional organization network analysis approaches may be used to determine the network densities. The number of actual connections between the two of the networks 202A-202D may be determined, for example, by evaluating electronic records describing instances of communication sessions between the computers 204 of the networks. Instances such as emails, text messages, phone calls, online meetings and/or other data communications between the computers 204 of the two networks 202A-202D can be used as an indication of an actual connection between the computers. In aspects, the determination of actual connections can be based on the number of such connections during a predetermined period of time, such as one or more hours or days. In these or other aspects, only one such instance of a connection between any two computers 204 of the two networks 202A-202D during the predetermined period of time may be used in connection with the determination of the number of actual connections (e.g., multiple separate or discrete emails between any two computers during the predetermined period of time is counted as one actual connection for purposes of determining the inter-network density). As a non-limiting example, a daily-based determination of actual connections of the two networks 202A and 202D may be seven in the situation where during a given twenty-four hour period, a first computer 204 of the network 202A sent one email to each of the four computers of the network 202D, a first of the computers of the network 202D sent three emails to both a second computer and a third computer of the network 202A, the fourth computer of the network 202D sent two emails to the third computer of the network 202A, and the first computer of the network 202D sent one email to the first computer of network 202A.

The number of potential connections between any two networks 202A and 202D may be determined, for example, based on the number of computers 204 in the associated networks using Equation 6 below, where x is the number of computers in the first of the networks and y is the number of computers in the second of the networks.

$$\text{potential connections} = x * y. \qquad \text{Eq. 6}$$

Other aspects of method 10 may user other approaches for determining the inter-network densities of the networks 202A-202D.

The inter-network metric is a metric defining a parameter relating to a factor or other characteristic that is desired to be optimized by the assignments provided by method 10. For example, the inter-network metric may be related to an amount or quantity of an effectiveness or an efficiency of communications between the networks 202A-202D. In aspects, for example, the inter-network metric may be determined based on an amount of data transmitted between the networks 202A-202D, or a cost of communications between the networks. For example, the amount of data transmitted between any two networks 202A-202D (e.g., during a predetermined time period which may or may not correspond to any time periods used in connection with the determination of the inter-group network density as described above) may be determined by records maintained in connection with the network infrastructures 210A-210D of the associated networks 202A-202D and/or network 208. Similarly, records of the costs of operating the network infrastructures 210A-210D and/or network 208 may be accessed or otherwise used to determine the inter-network metric in connection with step 18.

At step 19 the computing device 300 computes or determines a group proximity score for one or more of the networks 202A-202D (e.g., for each of the networks 202A-202D in aspects) with respect to one or more of the others of the networks 202A-202D (e.g., with respect to each of the other networks 202A-202D in aspects). For any two of the networks 202A-202D, the group proximity score may be based on the Inter-Network Score for the two networks and the sizes of the two networks. In aspects, the cardinalities of the networks may be used to represent the sizes of the networks. In aspects, Equation 6.5 below may be used to determine the group proximity score for any two networks 202A-202D, where C1 is the cardinality of a first of the two networks and C2 is the cardinality of a second of the two networks:

$$\text{group proximity score} = \text{Inter-Network Score}/(C1 * C2). \qquad \text{Eq. 6.5}$$

In other aspects the group proximity score is optimized by normalizing the score and normalizing the effect of cardinality on the final score. In these aspects, Equation 6.6 below may be used to determine the group proximity score:

$$\text{group proximity score} = \text{Inter-Network Score}/(C1 * C2)^{1/2}. \qquad \text{Eq. 6.6}$$

The method 10 determines which of the networks 202A-202D to assign to the computing resource 206 without exceeding the assignable capacity of the computing resource and at the same time enhancing factors characterized by the metric based on the Intra-Network Score and the Inter-Network Score. In the aspects shown in FIG. 1, for example, at step 20 the computing device 300 computes or determines a Collaboration Score (designated CS) for one or more of the networks 202A-202D (e.g., for each of the networks 202A-202D). In the aspects shown in FIG. 1, the Collaboration Score is determined using the Equation 7 below, where Σ group proximity scores is the sum of the group proximity score of the network 202A-202D with respect to one or more others of the networks (e.g., with respect to each of the other networks in aspects):

Eq. 7

$$\text{Collaboration Score} = \text{Intra-Network Score} + \sum \text{group proximity scores}.$$

Other aspects of method 10 may user other approaches for determining the Collaboration Score based on the Intra-Network Score and the Inter-Network Score.

FIG. 4 is a chart with exemplary representations of Intra-Network Scores and Collaboration Scores for networks 202A-202D, which may be determined using the approaches described above. In FIG. 4, the Intra-Network Scores for networks 202A-202D are 29, 45, 17 and 7, respectively. The Collaboration Score for any two networks 202A-202D is the number in the corresponding intersecting horizontal row and vertical column of the chart. For example, the Collaboration Score for and networks 202A and 202B is 19, and the Collaboration Score for Networks 202B and 202D is 0. FIG. 4 effectively represents the communication closeness between the networks 202A-202D.

As shown by step 22 in FIG. 1, computing device 300 assigns to the computing resource 206 an unassigned network 202A-202D that has a resource demand less than or equal to the remaining assignable capacity of the computing resource that has the highest Collaboration Score of the unassigned networks with a demand (e.g., based on the Collaboration Scores). When no networks 202A-202D have yet to be assigned, the computing device 300 will initially assign the network having a demand less than or equal to the assignable capacity of the computing resource and the highest Collaboration Score.

As shown by step 24, after a network 202A-202D has been assigned to the computing resource 206 the computing device 300 computes or determines a remaining assignable capacity of the computing resource. The remaining assignable capacity may be determined by subtracting the demand of the networks 202A-202D assigned to the computing resource 206 from the remaining assignable capacity of the computing resource. In the situation where only a first of the networks 202A-202D has been assigned to the computing resource 206, the remaining available capacity will be the initial assignable capacity less the demand of the first assigned network.

As shown by step 25, after a network 202A-202D has been assigned to the computing resource 206 the computing device 300 computes or determines a value capture of the assigned networks. The determined value capture may be representative of the total amount of efficiencies captured by the assigned networks. Equation 7.5 below may be used to determine the value capture, where the collaboration scores are the collaboration scores of the assigned networks:

$$\text{value capture} = \sum \text{collaboration scores.} \quad \text{Eq. 7.5}$$

As shown by step 26, after assigning a network 202A-202D to the computing resource 206, the computing device 300 determines whether there remain unassigned networks that have a demand less than the remaining assignable capacity of the computing resource. If there are such unassigned networks 202A-202D, steps 22 and 24 may be repeated as shown in FIG. 1 (e.g., the unassigned network having with a demand less than or equal to the remaining available capacity of the computing resource 206 and having the highest Collaboration Score is a assigned, and the remaining available capacity of the computing resource is determined).

As shown by step 28 in FIG. 1, steps 22, 24 and 26 may be repeated until there remain no unassigned networks having a demand that is less than or equal to the remaining unassigned capacity of the computing resource 206. In other aspects, the method 300 will repeat step 22 at least once to assign at least two networks 202A-202D to the computing resource 206.

As shown by step 30 in FIG. 1, the captured value provided by the method 10 may be evaluated. In aspects, for example, the captured value may be displayed. In other aspects the captured value can be displayed as a percentage of the total possible value that might be available for capture (e.g., based on a sum of the collaboration scores of all the networks 202A-202D, including those not assigned by the method).

Figure 5:
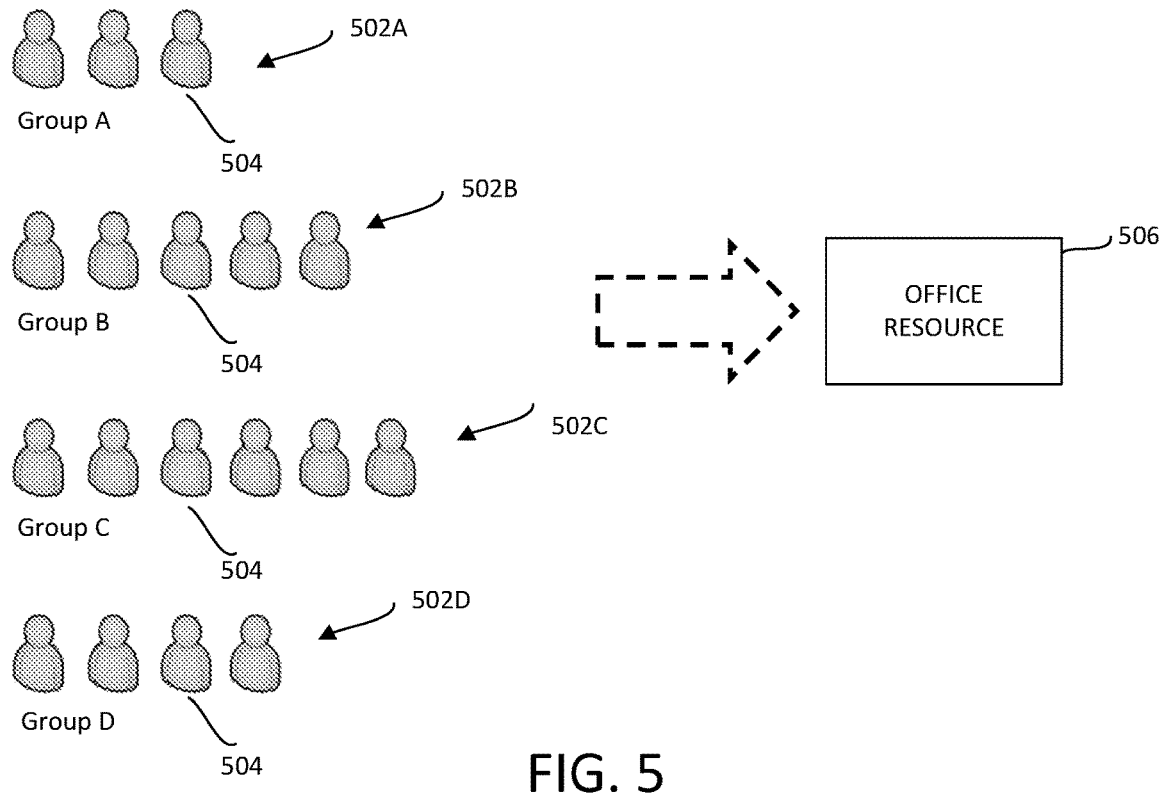
FIG. 5 is a diagrammatic illustration of groups of people that can be assigned to an office space resource, in accordance with aspects.

In other aspects, the method 10 can be used to assign other objects having demands to other capacity-limited resources. FIG. 5, for example, diagrammatically illustrates groups 502A-502D of people or users 504 and a physical space such as office resource 506 that does not have sufficient space or other resource capacity to accommodate all of the groups of users. As an example, the groups 502A-502D may be different groups of users 504 of an organization or other entity (e.g., accounting, product development, finance, human resources, operations and sales). Additionally or alternatively, the groups 502A-502D may be different groups of personnel working on different components of a product or service under development by the entity. Method 10 may be used to determine which of the groups 502A-502D to assign to the available and assignable capacity of the office resource 506 in a manner that enhances a factor such as the ability of the users 504 to communicate or collaborate based on actual in-person interactions enabled by the office resource 506.

With reference to step 12 of method 10 (FIG. 1), the method 10 can determine an assignable capacity of the office resource 506. The assignable capacity, which as noted above may be a capacity less than a maximum capacity, may be received from an information source defining specifications of the office resource 506, or may be inputted by a user operating the computing device performing the method 10. In aspects, for example, the assignable capacity may be specified in terms the number of available workspaces. The number of available workspaces may, for example, be a proxy for other capacity limitations of the office resource 506, such as the number of available parking spaces, or a number of available telephones or computer systems for users.

At step 14 the method 10 determines groups such as 502A-502D that are suitable for assignment to the office resource 506. For example, the assignable groups 502A-502D may be determined based on received information defining the groups within the entity (e.g., based on the entity's organizational chart). In other aspects a user may select or otherwise provide information defining the groups 502A-502D. Each of the groups 502A-502D is defined by an associated demand for the office resource 506. In aspects, for example, the demand for each group 502A-502D may be defined in terms of the number of users in the group.

At step 16 an intra-group communication score (Intra-Group Score; also denoted as 020 or object-to-object score) for one or more of the groups 502A-502D (e.g., for each of the groups 502A-502D in aspects) is determined. The Intra-Group Score is based upon an intra-group density and an intra-group metric. In aspects, for example, the Intra-Group Score can be determined using the Equation 8 below:

$$\text{Intra-Group Score} = \text{intra-group density} * \text{intra-group metric.} \quad \text{Eq. 8}$$

In aspects, the intra-group density is based upon the actual number of connections or interactions between the users 504 of the associated group 502A-502D and the potential number of connections or interactions between the users of the associated group. Conventional organization network analysis approaches may be used to determine the group densities. In aspects, for example, the intra-group density can be determined using the Equation 9 below:

$$\text{intra-group density} = \text{actual connections between users of the group}/ \text{potential connections between users of the group.} \quad \text{Eq. 9}$$

The number of actual connections between the users 504 of a group 502A-502D may be determined, for example, by evaluating electronic records describing instances of electronic communication sessions between the users 504 of the group 502A-502D. Instances such as emails, text messages, phone calls, online meetings and/or other data communications between the users 504 of the network 502A-502D can be used as an indication of an actual connection between the users. In aspects, the determination of actual connections can be based on the number of such connections during a predetermined period of time, such as one or more hours or days. In these or other aspects, only one such instance of a connection between any two users 504 of the network 202A-202D during the predetermined period of time may be used in connection with the determination of the number of actual connections (e.g., multiple separate or discrete emails between any two users 504 during the predetermined period of time is counted as one actual connection for purposes of determining the intra-group density). As a non-limiting example, a daily-based determination of actual connections of the users 504 of group 502A may be three in the situation where during a given twenty-four hour period, a first user 504 of the group sent one email to each of a second user and a third user of the group, the third user of the group sent five emails to a fourth user of the group, and the fourth user sent no emails to users in the group.

The number of potential connections between the users 504 of a group 502A-502D may be determined, for example, based on a number of users 504 in the associated group 502A-502D using the Equation 10 below, where n is the number of users in the group:

$$\text{potential connections} = n*(n-1)/2. \quad \text{Eq. 10}$$

Other aspects of the method 10 may use other approaches for determining the intra-group densities of the groups 502A-502D.

The intra-group metric is a metric defining a parameter relating to a factor or other characteristic that is desired to be optimized by the assignments provided by method 10. For example, the intra-group metric may be related to an amount or quantity of communications between the users 504 of the group 502A-502D. In aspects, for example, the intra-group metric may be determined based on an amount of data transmitted between computers (not shown) of the users 504 of the group 502A-502D. For example, the amount of data transmitted between the computers of the users 504 of the group 502A-502D (e.g., during a predetermined time period which may or may not correspond to any time periods used in connection with the determination of the intra-group density as described above) may be determined by records maintained in connection with the computer or other information technology network infrastructures (not shown) of the group 502A-502D. Alternatively or additionally, electronic records of these types can be used to determine one or more of a number of emails between the users 504 of the group 502A-502D, a number and/or length of electronic meetings between the users of the group, or a number and/or length of telephone calls between the users of the group.

At step 18 the method 10 computes or determines an inter-group communication score (Inter-Group Score; also denoted as a G2G or group-to-group score) for one or more of the networks 502A-502D (e.g., for each of the networks 502A-502D in aspects) with respect to one or more of the others of the networks 502A-502D (e.g., with respect to each of the others of the networks 502A-502D in aspects). For any two of the groups 502A-502D, the Inter-Group Score is based upon an inter-group density and an inter-group metric. In aspects, for example, the Inter-Group Score can be determined using the Equation 11 below:

$$\text{Inter-Group Score} = \text{inter-group density} * \text{inter-group metric.} \quad \text{Eq. 11}$$

In aspects, and similar to the intra-group density discussed above, the inter-group density for any two of the groups 502A-502D is based upon the actual number of connections between the groups and the potential number connections between the groups. In aspects, for example, the inter-group density can be determined using Equation 12 below:

$$\text{inter-group density} = \text{actual number of connections between the groups}/ \text{potential connections between the groups.} \quad \text{Eq. 12}$$

The number of actual connections between two groups 502A-502D may be determined, for example, by evaluating electronic records describing instances of electronic communication sessions between the users 504 of the groups. Instances such as emails, text messages, phone calls, online meetings and/or other data communications between the users 504 of the groups 502A-502D can be used as an indication of an actual connection between the groups. In aspects, the determination of actual connections can be based on the number of such connections during a predetermined period of time, such as one or more hours or days. In these or other aspects, only one such instance of a connection between any two users 504 of the groups 502A-502D during the predetermined period of time may be used in connection with the determination of the number of actual connections (e.g., multiple separate or discrete emails between any two users 504 during the predetermined period of time is counted as one actual connection for purposes of determining the actual inter-group density).

The number of potential connections between any two groups 502A-502D may be determined, for example, based on the number of users 504 in the associated groups using Equation 13 below, where x is the number of users in the first of the groups and y is the number of users in the second of the groups.

$$\text{potential connections} = x*y. \quad \text{Eq. 13}$$

Other aspects of method 10 may use other approaches for determining the inter-group densities of the groups 502A-502D.

The inter-group metric is a metric defining a parameter relating to a factor or other characteristic that is desired to be optimized by the assignments provided by method 10. For example, the inter-group metric may be related to an amount or quantity of communications between the two groups 502A-502D. In aspects, for example, the inter-group metric may be determined based on an amount of data transmitted between computers (not shown) of the users 504 of the two groups 502A-502D. For example, the amount of data transmitted between the computers of the users 504 of the two groups 502A-502D (e.g., during a predetermined time period which may or may not correspond to any time periods used in connection with the determination of the inter-group density as described above) may be determined by records maintained in connection with the computer or other information technology network infrastructures (not shown) of the groups. Alternatively or additionally, electronic records of these types can be used to determine one or more of a number of emails between the users 504 of the two groups 502A-502D, a number and/or length of electronic meetings between the users of the groups, or a number and/or length of telephone calls between the users of the groups.

At step 19 the computing device 300 computes or determines a group proximity score for one or more of the groups 502A-502D (e.g., for each of the groups 502A-502D in aspects) with respect to one or more of the others of the groups 502A-502D (e.g., with respect to each of the other groups 502A-502D in aspects). For any two of the groups 502A-502D, the group proximity score may be based on the Inter-Group Score for the two groups and the sizes of the two groups. In aspects, the cardinalities of the groups may be used to represent the sizes of the groups. In aspects, Equation 13.5 below may be used to determine the group proximity score for any two groups 502A-502D, where C1 is the cardinality of a first of the two groups and C2 is the cardinality of a second of the two groups:

$$\text{group proximity score} = \text{Inter-Group Score}/(C1 * C2). \quad \text{Eq. 13.5}$$

In other aspects the group proximity score is optimized by normalizing the score and normalizing the effect of cardinality on the final score. In these aspects, Equation 13.6 below may be used to determine the group proximity score:

$$\text{group proximity score} = \text{Inter-Group Score}/(C1 * C2)^{1/2}. \quad \text{Eq. 13.6}$$

Computing device 300 determines which of the groups 502A-502D to assign to the office resource 506 without exceeding the assignable capacity of the office resource and at the same time enhancing factors characterized by the metric based on the Intra-Group Score and the Inter-Group Score. In the aspects shown in FIG. 1, for example, at step 20 the computing device 300 computes or determines a Collaboration Score (designated CS) for one or more of the groups 502A-502D (e.g., for each of the groups 502A-502D with respect to each of the other groups). In the aspects shown in FIG. 1, the Collaboration Score is determined using the Equation 14 below, where E group proximity scores is the sum of the group proximity score of the group 502A-502D with respect to one or more others of the groups (e.g., with respect to each of the other groups in aspects):

$$\text{Collaboration Score} = \text{Intra-Group Score} + \sum \text{group proximity scores}. \quad \text{Eq. 14}$$

Other aspects of method 10 may use other approaches for determining the Collaboration Score based on the Intra-Group Score and the Inter-Group Score.

As shown by step 22 in FIG. 1, the device performing the method 10 assigns to the office resource 506 an unassigned group 502A-502D that has a resource demand less than or equal to the remaining assignable capacity of the office resource based on the Collaboration Score (e.g., with the highest Collaboration Score). When no groups 502A-502D have yet to be assigned, the computing device 300 will initially assign the group having a demand less than or equal to the assignable capacity of the office resource 506 and the highest Collaboration Score.

As shown by step 24, after a group 502A-502D has been assigned to the office resource 506, the computing device 300 computes or determines a remaining assignable capacity of the office resource. The remaining assignable capacity may be determined by subtracting the demand of the groups 502A-502D assigned to the office resource 506 (e.g., the number of uses in the assigned groups) from the remaining assignable capacity of the office resource. In the situation where only a first of the groups 502A-502D has been assigned to the office resource 506, the remaining available capacity will be the initial assignable capacity less the demand of the first assigned group.

As shown by step 25, after a group 502A-502D has been assigned to the office space 506 the computing device 300 computes or determines a value capture of the assigned groups. The determined value capture may be representative of the total amount of collaboration captured by the assigned groups. Equation 14.5 below may be used to determine the value capture, where the collaboration scores are the collaboration scores of the assigned groups:

$$\text{value capture} = \sum \text{collaboration scores}. \quad \text{Eq. 14.5}$$

As shown by step 26, after assigning a group 502A-502D to the office resource 506, the computing device 300 determines whether there remain unassigned groups that have a demand less than the remaining assignable capacity of the office resource. If there are such unassigned groups 502A-502D, steps 22 and 24 are repeated as shown in FIG. 1 (e.g., the unassigned group having with a demand less than or equal to the remaining available capacity of the office resource 506 and having the highest Collaboration Score is a assigned, and the remaining available capacity of the office resource is determined).

As shown by step 28 in FIG. 1, steps 22, 24 and 26 are repeated until there remain no unassigned groups 502A-502D having a demand that is less than or equal to the remaining unassigned capacity of the office resource 506. In other aspects, the method 10 will repeat step 22 at least once to assign at least two groups 502A-502D to the office resource 506.

Figure 6:
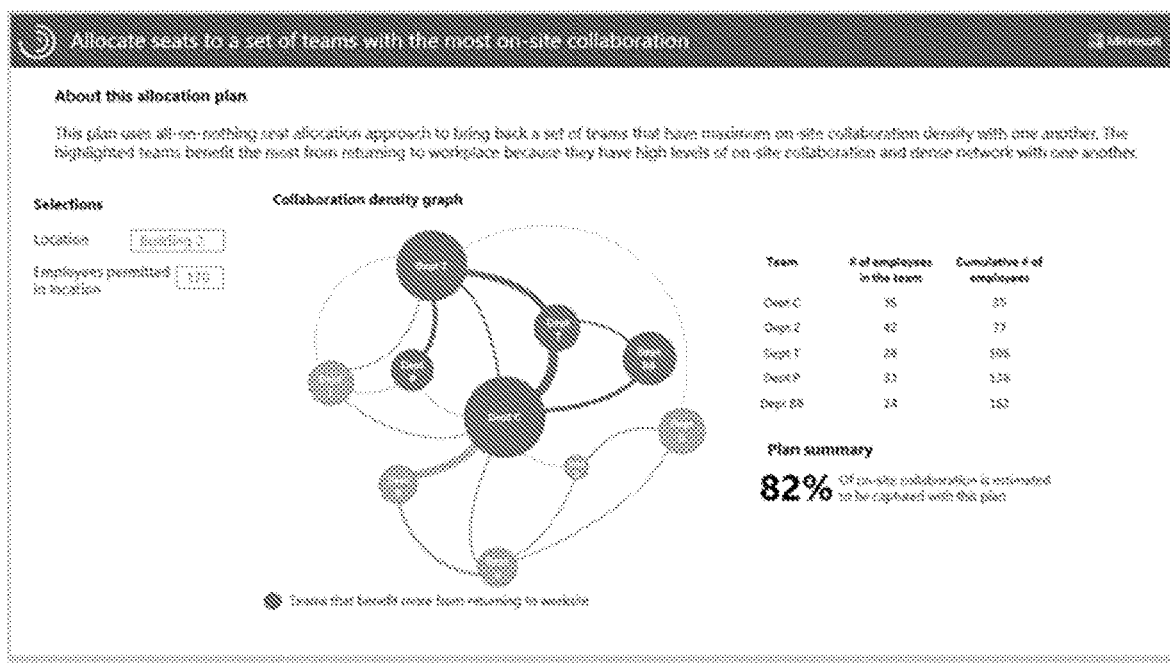
FIG. 6 is a display of graphical information that can be presented to users via a user interface, in accordance with aspects.

As shown by step 30 in FIG. 1, the captured value provided by the method 10 may be evaluated. In aspects, for example, the captured value may be displayed. In other aspects the captured value can be displayed as a percentage of the total possible value that might be available for capture (e.g., based on a sum of the collaboration scores of all the groups 502A-502D, including those not assigned by the method). FIG. 6, for example, illustrates a visual display of captured value that may be presented to a user via a graphical user interface (e.g., as described in connection with FIG. 3). FIG. 6 also includes a graphical illustration of groups such as 502A-502D. Sizes of the groups 502A-502D, inter-group collaboration, and amounts of inter-group collaboration are also graphically represented in the display shown in FIG. 6. In aspects, users can provide input through a user interface to control the operation of computing device 300 operating in accordance with method 10. For example, following a review of visual displays such as that shown in FIG. 6, a user may update information (e.g., using the user interface) used during the performance of method 10 and cause updated versions of resource allocations of resources to be determined and/or to provide associated displays.

By aspects of these types, multiple groups of people in an organization may be prioritized for return to a workplace. The data-driven approach optimizes utilization for on-site collaboration by prioritizing teams based on their collaboration patterns. The approach, which may be characterized as a greedy approach, optimizes the collaboration benefit that can be achieved by bringing together some of the groups or teams of people. While collaboration time signifies a depth or quantity of collaboration, network density determines a breadth of the collaboration, thus enriching the group-to-group communication to enhance the value of the assignments.

FIG. 3 and the associated descriptions provide a discussion of a variety of operating environments in which aspects of the disclosure may be practiced. However, the devices and systems illustrated and discussed with respect to FIG. 3 are for purposes of example and illustration and are not limiting of a vast number of computing device configurations that may be utilized for practicing aspects of the disclosure, described herein.

FIG. 3 is a block diagram illustrating physical components (e.g., hardware) of a computing device 300 with which aspects of the disclosure may be practiced. The computing device components described below may have computer executable instructions for implementing resource allocation program modules 1020 on a computing device, including computer executable instructions for the one or more modules that can be executed to employ the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 suitable for enabling the processing unit 1002 to run and access the one or more resource allocation assignment program modules 1020. The operating system 1005, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 3 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 3 by a removable storage device 1009 and a non-removable storage device 1010.

As stated above, a number of program modules and data files may be stored in the system memory 1004. While executing on the processing unit 1002, the program modules 1020 (e.g., the one or more resource allocation modules) may perform processes including, but not limited to, the aspects, as described herein. Other program modules that may be used in accordance with aspects of the present disclosure. Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 300 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 300 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device

300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Examples of a resource allocation system disclosed herein include at least one processing unit; and at least one memory storing computer-executable instructions that, when executed by the at least one processing unit, cause the at least one processing unit to: receive information defining an assignable capacity of a resource; receive information defining groups of one or more objects desiring access to the resource, wherein each of the groups of objects is defined by a resource demand; determine an intra-group communication score (Intra-Group Score) for one or more of the groups of objects, wherein: the Intra-Group Score is determined based upon an intra-network density and an intra-group metric; the intra-network density is the network density of the objects of the group of objects; and the intra-group metric is a metric defining communications between the objects of the group of objects; determine an inter-group communication score (Inter-Group Score) for one or more of the groups of objects with respect to one or more others of the groups of objects, wherein: the Inter-Group Score is determined based upon an inter-network density, and an inter-group metric; the inter-network density is the network density of the two groups of objects; and the inter-group metric is a metric defining communications between the two groups of objects; determine a group proximity score for one or more of the groups of objects with respect to one or more others of the groups of objects, based upon the Inter-Group Score of the group of objects and sizes of the two groups of objects; determine a collaboration score for one or more of the groups of objects, based upon the Intra-Group Score of the group of objects and the group proximity of the group of objects with respect to one or more others of the groups of objects; assign to the resource an unassigned group of objects having a resource demand less than or equal to a remaining capacity of the resource based upon the determined collaboration scores; determine a remaining capacity of the resource based upon the assignable capacity and the resource demands of the groups of objects assigned to the resource; determine a value capture of the groups of objects assigned to the resource, based upon the collaboration scores of the groups of objects; and repeating, at least once, the step of assigning to the resource an unassigned group of objects if one or more unassigned groups of objects has a resource demand that is less than or equal to the remaining capacity of the resource.

In one aspect, assigning an unassigned group of objects to the resource comprises assigning an unassigned group of objects having a highest collaboration score to the resource.

In another aspect, the intra-network density comprises an actual amount of connections between the objects of the group and a potential number of connections between the objects of the group.

The inter-network density may comprise an actual amount of connections between the objects of the two groups and a potential number of connections between the objects of the two groups.

In another aspect, the intra-group metric comprises one or more of a number of communication events between the objects of the group, a length of time of the communication events between the objects of the group, or a cost of the communication events between the objects of the group.

The inter-group metric may comprise one or more of a number of communications events between the two groups of objects, a length of time of the communication events between the two groups of objects, or a cost of the communication events between the two groups of objects.

In another aspect the inter-group metric comprises one or more of a number of communications events between the two groups of objects, a length of time of the communication events between the two groups of objects, or a cost of the communication events between the two groups of objects.

In another aspect, the resource comprises a computing resource; the groups of objects comprise computer networks, wherein each computer network includes a plurality of computers; and assigning a group of objects to the resource comprises assigning computer networks having a highest collaboration score to the computing resource. The intra-group metric may comprise one or more of a number of communication events between the computers of the network, a length of time of the communication events between the computers of the network, or a cost of the communication events between the computers of the network. The inter-group metric may comprise one or more of a number of communications events between the computer networks, a length of time of the communication events between the computer networks, or a cost of the communication events between the computer networks. The intra-network density may comprise an actual amount of connections between the computers of the network and a potential number of connections between the computers of the network; and the inter-network density may comprise an actual amount of connections between the computer networks and a potential number of connections between the computer networks.

In another aspect, the resource comprises a physical space; the groups of objects comprise groups of users; and assigning a group of objects to the resource comprises assigning groups of users having a highest collaboration score to the physical space. The intra-group metric may comprise one or more of a number of communication events between the users of the group, or a length of time of the communication events between the users of the group. The intra-group metric may comprise one or more of a number of emails between the users of the group, a number and/or length of on-line meetings between the users of the group, or a number and/or length of telephone calls between the users of the group. The inter-group metric may comprise one or more of a number of communications events between the groups of users, or a length of time of the communication events between the groups of users. The inter-group metric may comprise one or more of a number of emails between the groups of users, a number and/or length of on-line meetings between the groups of users, or a number and/or length of telephone calls between the groups of users.

In another aspect, the inter-group metric comprises one or more of a number of communications events between the groups of users, or a length of time of the communication events between the groups of users.

Examples include a computer-implemented method for assigning a computing resource defined by an assignable capacity to networks of computers defined by demands for the computing resource, comprising: determining by one or more processors an intra-network communication score (Intra-Network Score) for one or more of the networks of computers, wherein: the Intra-Network Score is determined based upon an intra-network density, and an intra-network metric; the intra-network density is determined based upon an actual number of electronic connections between computers of the network and a potential number of electronic connections between the computers of the network; and the intra-network metric is a metric defining communications between the computers of the network, and determined based upon one or more of an amount of data transmitted between the computers of the network or a cost of communications between the computers of the network; determining by the one or more processors an inter-network communication score (Inter-Network Score) for one or more of the networks of computers with respect to one or more others of the networks of computers, wherein: the Inter-Network Score is determined based upon an inter-network density and an inter-group metric; the inter-network density is determined based upon an actual number of electronic connections between the networks of computers and a potential number of electronic connections between the networks of computers; the inter-network metric is a metric defining communications between the networks of computers and determined based upon one or more of an amount of data transmitted between the networks of computers or a cost of communications between the networks of computers; determining by the one or more processors a group proximity for one or more of the networks of computers with respect to one or more others of the networks of computers, based upon the Inter-Network Score of the network of computers and sizes of the two networks of computers; determining by the one or more processors a collaboration score for one or more of the networks of computers, based upon the Intra-Network Score of the network of computers and the group proximity of the network of computers with respect to one or more others of the networks of computers; assign to the computing resource by the one or more processors an unassigned network of computers having a demand for the computing resource less than or equal to a remaining capacity of the computing resource based upon the determined collaboration scores; determining a remaining capacity of the computing resource based upon the assignable capacity and the demands of the networks of computers assigned to the computing resource; determining a value capture of the networks of computers assigned to the computing resource, based upon the collaboration scores of the networks of computers; and repeating, at least once, the step of assigning to the computing resource an unassigned network of computers if one or more unassigned networks of computers has a demand less than or equal to the remaining capacity of the computing resource.

Examples include a system for assigning physical office space defined by an assignable capacity to groups of people, comprising: at least one processing unit; and at least one memory storing computer-executable instructions that, when executed by the at least one processing unit, cause the at least one processing unit to: determine groups of people suitable for assignment to the office space based on electronic records, including a number of the people in each group; determine an intra-group communication score (Intra-Group Score) for one or more of the groups of people, wherein: the Intra-Group Score is determined based upon an intra-group network density and an intra-group communication metric; the intra-group network density is determined based upon an actual number of electronic communication connections between the people of the group and a potential number of electronic communication connections between the people of the group; and the intra-group communication metric is a metric defining an amount of communications between the people of the group, and determined based upon one or more of a number of emails between the people of the group, a number and/or length of electronic meetings between the people of the group, or a number and/or length of telephone calls between the people of the group; determine an inter-group communication score (Inter-Group Score) for one or more of the groups of people with respect to one or more others of the groups of people, wherein: the Inter-Group Communication score is determined based upon an inter-group network density, and an inter-group communication metric; the inter-group network density is determined based upon an actual number of electronic communication connections between the groups of people and a potential number of electronic communication connections between the groups of people; and the inter-group communication metric is a metric defining an amount of communications between the groups of people, and determined based upon one or more of a number of emails between the groups of people, a number and/or length of electronic meetings between the groups of people, or a number and/or length of telephone calls between the groups of people; determine a group proximity for one or more of the groups of people with respect to one or more others of the groups of people, based upon the Inter-Group Score of the group of people and sizes of the two groups of people; determine a collaboration score for one or more of the groups of people, based upon the Intra-Group Score of the group of people and the group proximity of the group of people with respect to one or more others of the groups of people; assign to the office space an unassigned group of people where the number of people in the group is less than or equal to a remaining capacity of the office space based upon the determined collaboration scores; determining a remaining capacity of the office space based upon the assignable capacity and the number of people in the groups of people assigned to the office space; determining a value capture of the groups of people assigned to the office space, based upon the collaboration scores of the groups of people; and repeating, at least once, the step of assigning to the office space an unassigned group of people if one or more unassigned groups of people have numbers of people less than or equal to the remaining capacity of the office space.

Examples include a system for assigning physical office space defined by an assignable capacity to groups of people, comprising: at least one processing unit; and at least one memory storing computer-executable instructions that, when executed by the at least one processing unit, cause the at least one processing unit to: determine groups of people suitable for assignment to the office space based on electronic records, including a number of the people in each group; determine an intra-group communication score (Intra-Group Score) for one or more of the groups of people, wherein the Intra-Group Score is determined based upon an intra-group network density and an intra-group communication metric; determine an inter-group communication score (Inter-Group Score) for one or more of the groups of people with respect to one or more others of the groups of people, wherein the Inter-Group Communication score is determined based upon an inter-group network density, and an inter-group communication metric; determine a collaboration score for one or more of the groups of people, based upon the Intra-Group Score of the group of people and one or more of the Inter-Group Scores of the group of people; assign to the office space an unassigned group of people where the number of people in the group is less than or equal to a remaining capacity of the office space based upon the determined collaboration scores; determining a value capture of the groups of people assigned to the office space, based upon the collaboration scores of the groups of people; providing a user interface including a visual display of information about the assigned groups of people, including the associated value capture; and repeating, at least once, the step of assigning to the office space an unassigned group of people if one or more unassigned groups of people have numbers of people less than or equal to a remaining capacity of the office space.

In aspects, the at least one processing unit is configured to receive updated information regarding the assignment of physical office space, and to repeat the steps of assigning groups of people to the office space in response to the updated information.

The description and illustration of one or more aspects provided in this application are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
   at least one processing unit; and
   at least one memory storing computer-executable instructions that, when executed by the at least one processing unit, cause the at least one processing unit to:
   receive information defining an assignable capacity of a resource;
   receive information defining groups of objects desiring access to the resource, wherein each group of the groups of objects is defined by a resource demand;
   determine an intra-group communication score (Intra-Group Score) for respective each group of the groups of objects, wherein:
      the Intra-Group Score is determined based upon an intra-network density and an intra-group metric;
      the intra-network density is the network density of the objects of the respective each group of the groups of objects; and
      the intra-group metric is a metric defining communications between the objects of the respective each group of the groups of objects;
   determine an inter-group communication score (Inter-Group Score) for the respective each group of the groups of objects with respect to respective each other group of the groups of objects, wherein:
      the Inter-Group Score is determined based upon an inter-network density, and an inter-group metric;
      the inter-network density is the network density of the two groups of objects; and
      the inter-group metric is a metric defining communications between the two groups of objects;
   determine a group proximity for the respective each group of the groups of objects with respect to the respective each other group of the groups of objects, based upon the Inter-Group Score of the respective each group of objects and sizes of the two groups of objects;
   determine a collaboration score for the respective each group of the groups of objects, based upon the Intra-Group Score of the respective each group of objects and the group proximity of the respective each group of objects with respect to the respective each other group of the groups of objects;
   assign to the resource an unassigned group of objects having a resource demand less than or equal to a remaining capacity of the resource based upon the determined collaboration scores;
   determine a remaining capacity of the resource based upon the assignable capacity and the resource demands of the groups of objects assigned to the resource;
   determine a value capture of the groups of objects assigned to the resource, based upon the collaboration scores of the groups of objects; and
   repeating, at least once, the step of assigning to the resource an unassigned group of objects if one or more unassigned groups of objects has a resource demand that is less than or equal to the remaining capacity of the resource.

2. The system of claim 1 wherein assigning an unassigned group of objects to the resource comprises assigning an unassigned group of objects having a highest collaboration score to the resource.

3. The system of claim 1 wherein the intra-network density comprises an actual amount of connections between the objects of the group and a potential number of connections between the objects of the group.

4. The system of claim 3 wherein the inter-network density comprises an actual amount of connections between the objects of the two groups a potential number of connections between the objects of the two groups.

5. The system of claim 1 wherein the inter-network density comprises an actual amount of connections between the objects of the two groups and a potential number of connections between the objects of the two groups.

6. The system of claim 1 wherein the intra-group metric comprises one or more of a number of communication events between the objects of the group, a length of time of the communication events between the objects of the group, or a cost of the communication events between the objects of the group.

7. The system of claim 1 wherein the inter-group metric comprises one or more of a number of communications events between the two groups of objects, a length of time of the communication events between the two groups of objects, or a cost of the communication events between the two groups of objects.

8. The system of claim 1 wherein:
   the resource comprises a computing resource;
   the groups of objects comprise computer networks, wherein each computer network includes a plurality of computers; and
   assigning a group of objects to the resource comprises assigning computer networks having a highest collaboration score to the computing resource.

9. The system of claim 8 wherein:
the intra-network density comprises an actual amount of connections between the computers of the network and a potential number of connections between the computers of the network; and
the inter-network density comprises an actual amount of connections between the computer networks and a potential number of connections between the computer networks.

10. The system of claim 1 wherein:
the resource comprises a physical space;
the groups of objects comprise groups of users; and
assigning a group of objects to the resource comprises assigning groups of users having a highest collaboration score to the physical space.

11. The system of claim 10 wherein the intra-group metric comprises one or more of a number of communication events between the users of the group, or a length of time of the communication events between the users of the group.

12. The system of claim 10 wherein the inter-group metric comprises one or more of a number of communications events between the groups of users, or a length of time of the communication events between the groups of users.

13. A computer-implemented method for assigning a computing resource defined by an assignable capacity to networks of computers defined by demands for the computing resource, comprising:
determining by one or more processors an intra-network communication score (Intra-Network Score) for respective each network of the networks of computers, wherein:
the Intra-Network Score is determined based upon an intra-network density, and an intra-network metric;
the intra-network density is determined based upon an actual number of electronic connections between computers of the network and a potential number of electronic connections between the computers of the network; and
the intra-network metric is a metric defining communications between the computers of the network, and determined based upon one or more of an amount of data transmitted between the computers of the network or a cost of communications between the computers of the network;
determining by the one or more processors an inter-network communication score (Inter-Network Score) for the respective each network of the networks of computers with respect to respective each other network of the networks of computers, wherein:
the Inter-Network Score is determined based upon an inter-network density and an inter-group metric;
the inter-network density is determined based upon an actual number of electronic connections between the networks of computers and a potential number of electronic connections between the networks of computers;
the inter-network metric is a metric defining communications between the networks of computers and determined based upon one or more of an amount of data transmitted between the networks of computers or a cost of communications between the networks of computers;
determining by the one or more processors a group proximity for the respective each network of the networks of computers with respect to the respective each other network of the networks of computers, based upon the Inter-Network Score of the respective each network of computers and sizes of the two networks of computers;
determining by the one or more processors a collaboration score for the respective each network of the networks of computers, based upon the Intra-Network Score of the network of computers and the group proximity of the network of computers with respect to the respective each other network of the networks of computers;
assign to the computing resource by the one or more processors an unassigned network of computers having a demand for the computing resource less than or equal to a remaining capacity of the computing resource based upon the determined collaboration scores;
determining a remaining capacity of the computing resource based upon the assignable capacity and the demands of the networks of computers assigned to the computing resource;
determining a value capture of the networks of computers assigned to the computing resource, based upon the collaboration scores of the networks of computers; and
repeating, at least once, the step of assigning to the computing resource an unassigned network of computers if one or more unassigned networks of computers has a demand less than or equal to the remaining capacity of the computing resource.

14. A system for assigning physical office space defined by an assignable capacity to groups of people, comprising:
at least one processing unit; and
at least one memory storing computer-executable instructions that, when executed by the at least one processing unit, cause the at least one processing unit to:
determine groups of people suitable for assignment to the office space based on electronic records, including a number of the people in each group;
determine an intra-group communication score (Intra-Group Score) for respective each group of the groups of people, wherein the Intra-Group Score is determined based upon an intra-group network density and an intra-group communication metric;
determine an inter-group communication score (Inter-Group Score) for the respective each group of the groups of people with respect to respective each other group of the groups of people, wherein the Inter-Group Communication score is determined based upon an inter-group network density, and an inter-group communication metric;
determine a collaboration score for the respective each group of the groups of people, based upon the Intra-Group Score of the respective each group of people and one or more of the Inter-Group Score of the respective each group of people;
assign to the office space an unassigned group of people where the number of people in the group is less than or equal to a remaining capacity of the office space based upon the determined collaboration scores;
determining a value capture of the groups of people assigned to the office space, based upon the collaboration scores of the groups of people;
providing a visual display of information about the assigned groups of people, including the associated value capture; and
repeating, at least once, the step of assigning to the office space an unassigned group of people if one or more unassigned groups of people have numbers of people less than or equal to a remaining capacity of the office space.

15. The system of claim 14, wherein the at least one processing unit is configured to receive updated information regarding the assignment of physical office space, and to repeat steps of claim 14 in response to the updated information.

16. The system of claim 1 wherein the collaboration score for the respective each group of the groups of objects is determined based upon a sum of the group proximities of the respective each group of the groups of objects with respect to the respective each other group of the groups of objects.

17. The method of claim 13 wherein the collaboration score for the respective each network of the networks is determined based upon a sum of the group proximities of the respective each network of the networks with respect to the respective each other network of the networks.

18. The system of claim 14 wherein the collaboration score for the respective each group of the groups is determined based upon a sum of the Inter-Group Scores of the respective each group of the groups with respect to the respective each other group of the groups.

* * * * *